V. IVARSON.
TRACTOR.
APPLICATION FILED SEPT 27, 1918.
1,426,070.
Patented Aug. 15, 1922.
2 SHEETS—SHEET 1.
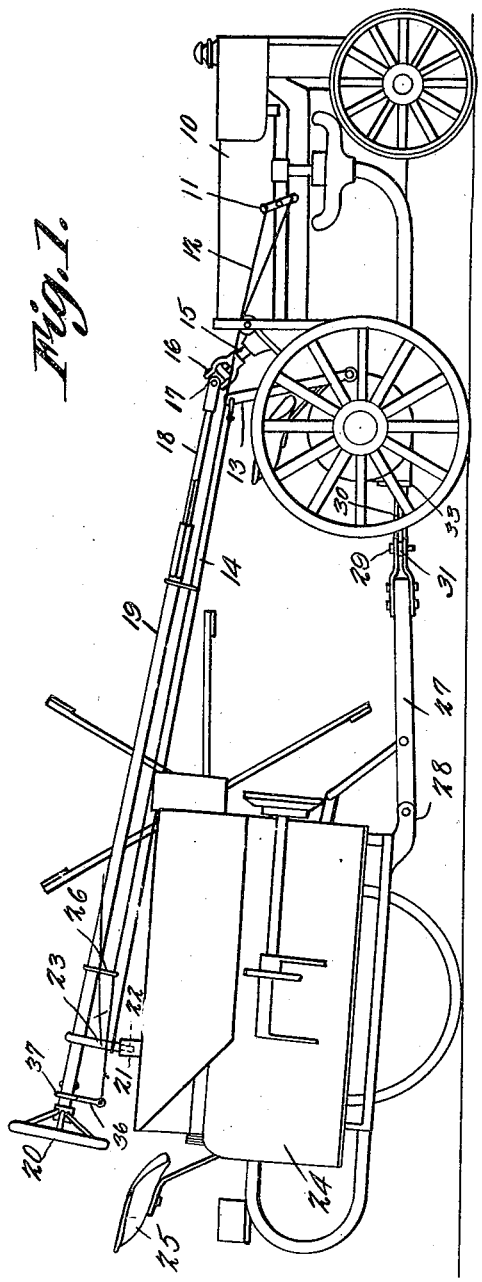
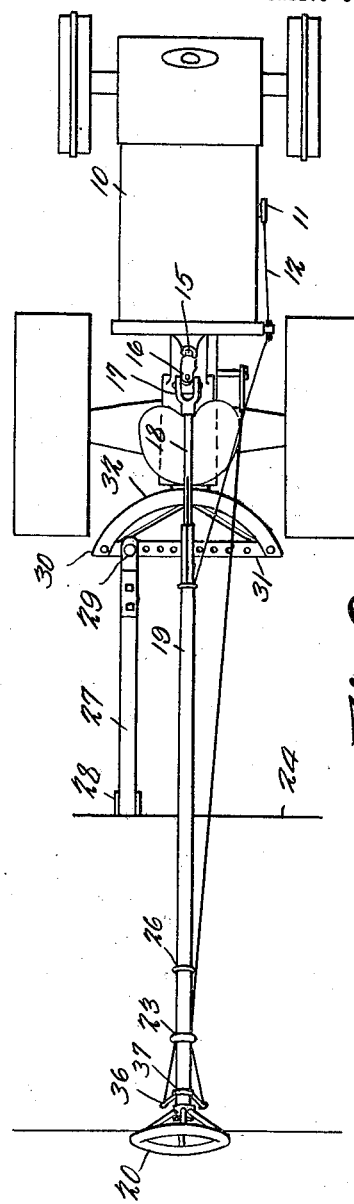
Inventor,
Victor Ivarson.
By ............
Attorney

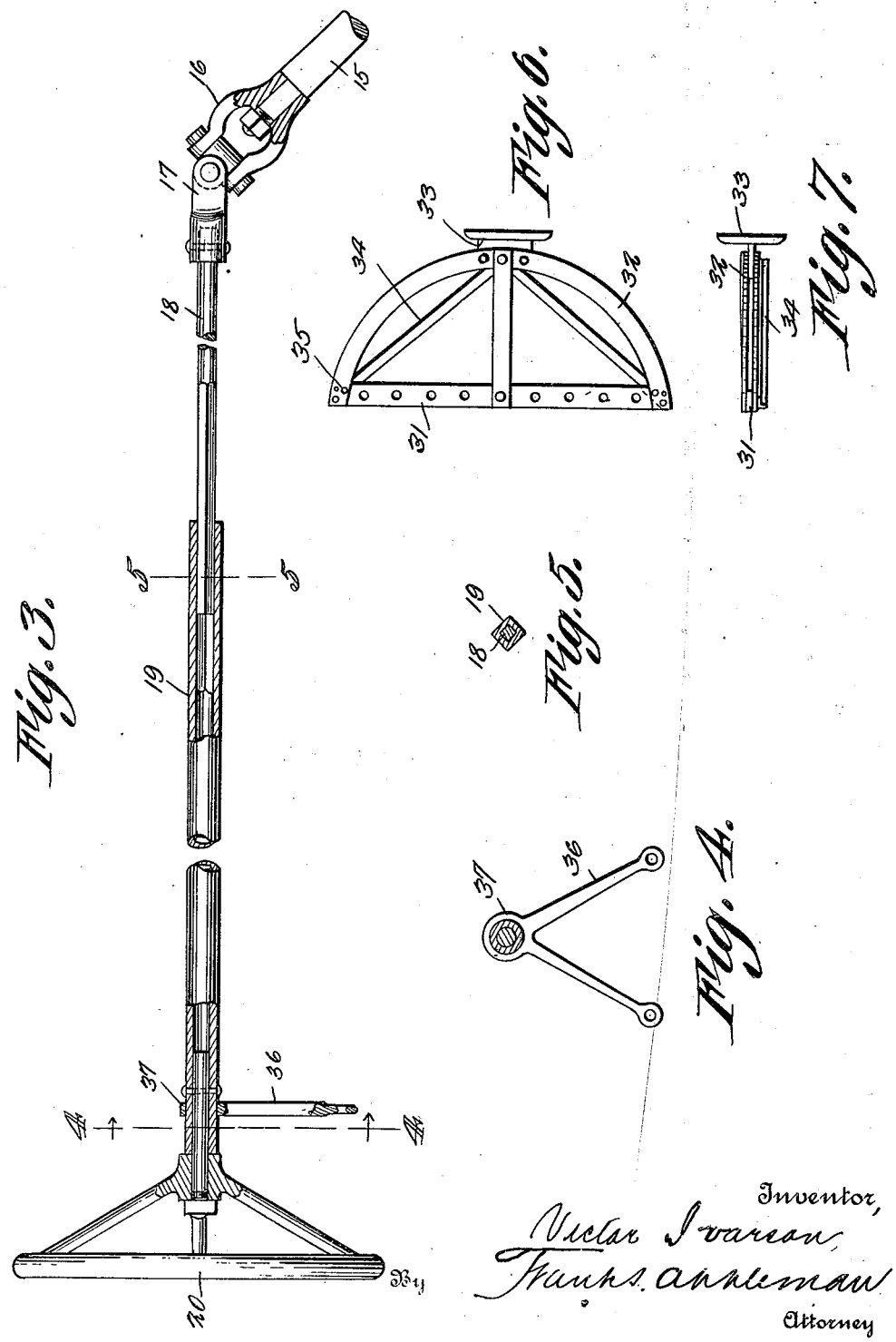

UNITED STATES PATENT OFFICE.

VICTOR IVARSON, OF CLEGHORN, IOWA.

TRACTOR.

1,426,070.
Specification of Letters Patent.
Patented Aug. 15, 1922.

Application filed September 27, 1918. Serial No. 255,971.

*To all whom it may concern:*

Be it known that I, VICTOR IVARSON, a citizen of the United States of America, and resident of Cleghorn, in the county of Cherokee and State of Iowa, have invented certain new and useful Improvements in Tractors, of which the following is a specification.

This invention relates to tractors and particularly to means whereby the tractor is controlled from a distant point as from the trailer and particularly the invention has for its object the provision of novel means whereby a tractor control may be installed on a binder in order that an operator may control the binder mechanism while guiding the tractor and operating the throttle thereof.

A further object of this invention is to provide novel draft rigging connecting the tractor and trailer to insure proper positioning of the trailer with respect to the tractor and to allow free movement of the coupling in turning.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a view in elevation of a tractor and binder;

Figure 2 illustrates a plan view of the tractor with the details of the binder omitted;

Figure 3 illustrates an enlarged detail view of a part of the steering mechanism;

Figure 4 illustrates a sectional view on the line 4—4 of Figure 3;

Figure 5 illustrates a sectional view on the line 5—5 of Figure 3;

Figure 6 illustrates a plan view of the coupling; and

Figure 7 illustrates a side elevation thereof.

In these drawings 10 denotes the tractor with a throttle or fuel control 11 actuated by a flexible member 12 which may lead to any suitable station to be manipulated by an operator.

The clutch controlling lever 13 may be coupled in any suitable way to operate the clutch, but as the details of construction of the clutch control are immaterial, it is not shown more specifically.

The lever 13 is supplied with an operating member 14 which may also lead to the station occupied by the operator.

The tractor has a steering post or shaft 15 with a member 16 of a universal joint connected to it and the said member 16 coacts with a member 17 of the shaft 18, which shaft telescopes in the hollow shaft 19, which hollow shaft is supplied with a hand wheel 20 by which the hollow shaft is turned for steering the tractor.

The hollow shaft is supported by a post 21 which has a socket 22 in which a bracket 23 is swiveled, the said bracket having its upper end embracing the hollow shaft and rotatably holding it so that the hollow shaft may be free to turn and also free to oscillate as the bracket 23 turned in the socket of the post.

The binder 24 which in this instance is the trailer, is supplied with a seat 25 for the operator and the throttle operating member 12 extends rearwardly through suitable guides 26 which are suspended from the hollow shaft and within convenient reach of an operator who may occupy the seat 25.

The draw bar 27 is hingedly connected to a bracket 28 on the binder or harvester and the said draw bar has an end connected by a pin 29 to a coupling 30 which coupling includes a transversely disposed apertured bar 31, the apertures of which receive the pivot 29 so that the draw bar may be connected to the coupling at one of any of the positions indicated by the apertures in the transverse bar. The transverse bar has its ends attached to a yoke 32 and the yoke has a head or plate 33 which may be bolted or otherwise attached to the tractor or to a portion of the frame thereof. Braces 34 extend from the head to the ends of the yoke and the said braces are attached to the transversely disposed bar and to the ends of the yokes by suitable fastenings 35 which may be rivets, bolts or the like.

It will be seen from an inspection of the drawing that the operator may turn the wheel 20 to steer the tractor or that he may manipulate the connection 12 for increasing or diminishing the supply of fuel and that he may manipulate the flexible member 14 for operating the clutch.

If desired, suitable arms 36 may radiate from a hub or body section 37 and the said hub or body section can be mounted on the hollow shaft and the connections from the clutch or fuel control can be attached to the arms and that has been found a convenient arrangement to hold the parts in operative relation to the occupant of the seat.

I claim:

1. In a draft device for tractors, the combination of a frame adapted to be rigidly secured at its front end to a rearwardly extending draft lug of a tractor and having rearwardly extending diverging arms, and a cross bar connecting the ends of said arms and having a plurality of openings for the attachment of draft means adjustably along said cross bar.

VICTOR IVARSON.